United States Patent
Lowe

(10) Patent No.: US 12,333,364 B2
(45) Date of Patent: *Jun. 17, 2025

(54) METAL DUAL INTERFACE CARD

(71) Applicant: CompoSecure, LLC, Somerset, NJ (US)

(72) Inventor: Adam Lowe, Somerset, NJ (US)

(73) Assignee: CompoSecure, LLC, Somerset, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/535,299

(22) Filed: Dec. 11, 2023

(65) Prior Publication Data

US 2024/0119249 A1    Apr. 11, 2024

Related U.S. Application Data

(63) Continuation of application No. 17/502,790, filed on Oct. 15, 2021, now Pat. No. 11,842,240, which is a
(Continued)

(51) Int. Cl.
*G06K 19/06* (2006.01)
*G06K 19/07* (2006.01)
*G06K 19/077* (2006.01)

(52) U.S. Cl.
CPC ... *G06K 19/0723* (2013.01); *G06K 19/07773* (2013.01)

(58) Field of Classification Search
CPC ........... G06K 19/06046; G06K 19/067; G06K 17/0025; G06Q 20/32
(Continued)

(56) References Cited

U.S. PATENT DOCUMENTS 6,378,774 B1    4/2002    Emori et al.
7,823,777 B2    11/2010    Varga et al.
(Continued)

FOREIGN PATENT DOCUMENTS

CN    205721902 U    11/2016
EP    2068274 A1    6/2009
(Continued)

OTHER PUBLICATIONS

Office Action issued Jan. 29, 2024, by the Brazil Patent Office in corresponding Brazilian Patent Application No. BR112019013873-0 and an English translation of the Office Action. (5 pages).
(Continued)

*Primary Examiner* — Daniel St Cyr
(74) *Attorney, Agent, or Firm* — Buchanan Ingersoll & Rooney PC

(57) ABSTRACT

A dual interface transaction card includes a metal card body having first and second surfaces. A contact-only transaction module is secured in the card body, the contact-only transaction module including contact pads disposed on the first surface of the card body and including a first transaction circuit. A contactless transaction module is secured in a void in the metal card body. The contactless transaction module includes a second transaction circuit and an antenna. Also disclosed is a process for manufacturing the dual interface transaction card. The process includes the steps of constructing a metal card body having the first and second surfaces, securing the contact-only transaction module in the metal card body, forming the void in the metal card body, and securing the contactless transaction module in the void.

19 Claims, 12 Drawing Sheets

Related U.S. Application Data continuation of application No. 16/476,949, filed as application No. PCT/US2018/013060 on Jan. 10, 2018, now Pat. No. 11,182,662.

(60) Provisional application No. 62/524,063, filed on Jun. 23, 2017, provisional application No. 62/444,994, filed on Jan. 11, 2017.

(58) Field of Classification Search
USPC .......................................... 235/492, 487, 488
See application file for complete search history.

(56) References Cited

U.S. PATENT DOCUMENTS

| | | | |
|---|---|---|---|
| 9,390,366 | B1 | 7/2016 | Herslow et al. |
| 10,395,163 | B2 | 8/2019 | Fu |
| 11,182,662 | B2 * | 11/2021 | Lowe ................. G06K 19/0723 |
| 11,842,240 | B2 * | 12/2023 | Lowe ................. G06K 19/0723 |
| 2009/0043925 | A1 | 2/2009 | Huomo et al. |
| 2010/0176205 | A1 * | 7/2010 | Patrice ............. G06K 19/07749 |
| | | | 235/492 |
| 2010/0320270 | A1 | 12/2010 | Ryu et al. |
| 2015/0021403 | A1 | 1/2015 | Finn et al. |
| 2015/0235122 | A1 | 8/2015 | Finn et al. |
| 2015/0317554 | A1 | 11/2015 | Le Garrec et al. |
| 2016/0180212 | A1 | 6/2016 | Herslow et al. |

FOREIGN PATENT DOCUMENTS

| | | |
|---|---|---|
| JP | 2011-521377 A | 7/2011 |
| WO | 2014/113765 A1 | 7/2014 |

OTHER PUBLICATIONS

Korean Request for the Submission of an Opinion for Korean Application No. 10-2023-7036113, Dec. 13, 2023 with English translation, 9 pages.

* cited by examiner

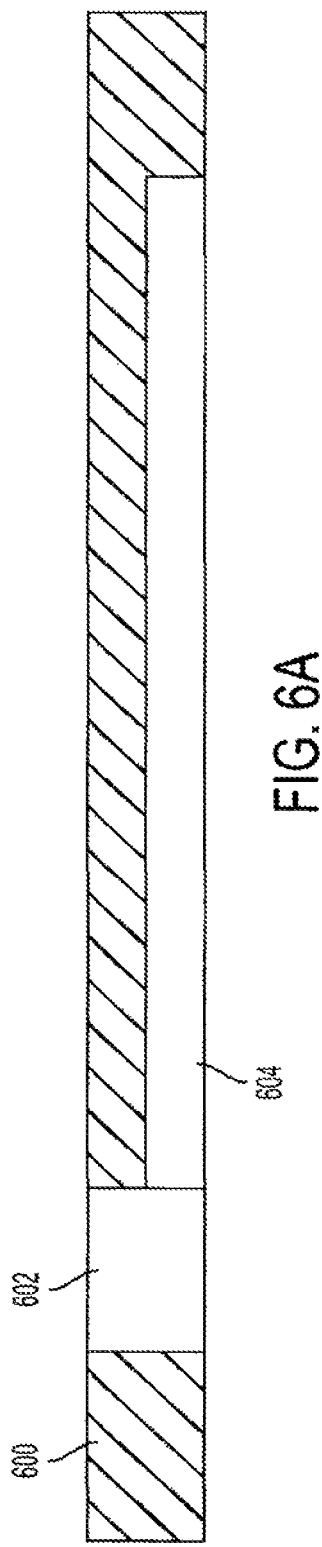

METAL DUAL INTERFACE CARD

This application is a continuation of U.S. patent application Ser. No. 17/502,790, filed on Oct. 15, 2021 (status: allowed), which is a continuation of U.S. patent application Ser. No. 16/476,949, filed on Jul. 10, 2019, now U.S. Pat. No. 11,182,662, issued Nov. 23, 2021, which is a U.S. National Phase Application of PCT Application Ser. No. PCT/US2018/013060, filed Jan. 10, 2018 and claims the benefit of priority to U.S. Provisional Application No. 62/444,994, filed on Jan. 11, 2017 and U.S. Provisional Application No. 62/524,063 filed on Jun. 23, 2017, the contents of which are incorporated herein by reference in their entirety for all purposes.

BACKGROUND OF THE INVENTION

Currently, most dual interface cards have a single integrated circuit chip that is connected both to the metal contacts visible on and accessible from the exterior of the card and to the system embedded in the card for sending and receiving contactless signals, which system for a metal card typically includes a booster antenna (and its attendant ferrite shielding layer) or a gap in the card body edge (which obviates the need for a booster antenna) to facilitate the sending and receiving of contactless signals. The booster antenna or gap in the card body edge typically modifies the structural rigidity of the card and/or detracts from the overall "metallic" behavior of the card, such as the metallic sound produced when a metal card is dropped on a table. This metallic sound is a highly desirable feature of such cards to many who carry them. Accordingly, producing a metal transaction card with dual interface (contact and contactless) functionality, while maintaining the structural rigidity and desired "metallic" sound of the card, is highly desired.

SUMMARY OF THE INVENTION

One aspect of the invention comprises a dual interface transaction card, comprising a metal card body having first and second surfaces; a contact-only transaction module and a contactless transaction module disposed in a void in the metal card body. The contact-only transaction module has contact pads disposed on one of the first and second surfaces of the card body and comprises a first transaction circuit, and the contactless transaction module comprises a second transaction circuit and an antenna. The first transaction circuit and the second transaction circuit may be independently personalized.

In one embodiment, the contact pads are disposed on the first surface of the card body and the void comprises a pocket in the metal card body that is open to the second surface of the card body. In other embodiments, the pocket may be open to the same side of the card as the contact pads. The contactless transaction module may be adhesively bonded to a bottom of the pocket. The contactless transaction module may comprise one or more of an outer layer disposed flush with the second surface of the card body, a layer containing the second transaction circuit and the antenna, a ferrite layer, an adhesive layer, and a filler layer.

In another embodiment, the void comprises a through-hole in the metal card body that extends from the first to the second surface of the card body. In this embodiment, the contactless transaction module may comprise a multi-layer plug or disc that has a first outer layer aligned with the first surface of the card body and a second outer layer aligned with the second surface of the card body. In this embodiment, an antenna layer located between the first and second outer layers may comprise the second transaction circuit and the antenna, and at least one filler layer may also be located between the first and second outer layers. A ferrite layer may be absent from the contactless transaction module in this embodiment.

Another aspect of the invention comprises a process for manufacturing a dual interface transaction card. The process comprises the steps of (a) constructing a metal card body having first and second surfaces; (b) embedding a contact-only transaction module in the metal card body; (c) forming a void in the metal card body; and (d) disposing a contactless transaction module in the void. The contact-only transaction module has contact pads disposed on one of the first and second surfaces of the card body and comprises a first transaction circuit, and the contactless transaction module comprises a second transaction circuit and an antenna. The process may further comprise the step of personalizing the first transaction circuit independently from personalizing the second transaction circuit.

In one embodiment, the process steps may comprise disposing the contact pads on the first surface of the card body, forming the void in the form of a pocket open to the second surface of the card body and having a bottom adjacent the first surface of the card body, and adhering the contactless transaction module to the bottom of the pocket. The contactless transaction module may be provided in the form of a sticker comprising an outer layer configured to be disposed flush with the second surface of the card body, an antenna layer containing the second transaction circuit and the antenna, a ferrite layer, and an adhesive layer covered with removable liner paper, in which case the step of adhering the module to the bottom of the pocket comprises first removing the removable liner paper and then pressing the adhesive layer against the bottom of the pocket.

In another embodiment, the process steps comprise forming a through-hole extending from the first surface to the second surface of the card body, and disposing the contactless transaction module in the through-hole. The contactless transaction module may be provided in the form of a multi-layer plug or disc that has a first outer layer and a second outer layer, in which disposing the contactless transaction module in the void comprises fitting the plug into the through-hole so that the first outer layer aligns with the first surface of the card body and the second outer layer aligns with the second surface of the card body.

BRIEF DESCRIPTION OF THE DRAWINGS

According to common practice, the various features of the drawings are not drawn to scale unless otherwise indicated.

FIG. 6A is a schematic drawing depicting a cross sectional view of an exemplary card having a pocket and through hole formed to accommodate a single dual interface module having contact and a contactless features.

DETAILED DESCRIPTION OF THE INVENTION

Figure 1:
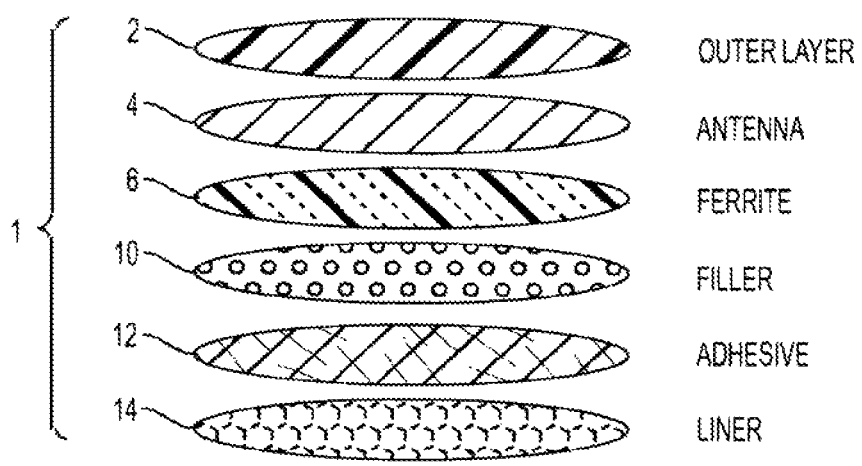
FIG. 1 is a schematic exploded view of an RF shielded sticker of an exemplary contactless module assembly.

The invention is best understood from the following detailed description when read in connection with the accompanying drawings, with like elements having the same reference numerals.

One aspect of the invention comprises a split, contact/contactless approach with a RF shielded payment sticker and a contact-only payment module. This enables contactless payment capability without requiring a booster antenna in the card body or incorporating a gap in the card body edge. Contactless payment stickers and RF shielded payment stickers are commercially available and have been deployed in the field (TBC Bank, 2016). RF Shielded payment stickers are also commercially offered by payment solution providers such as Gemalto (Gemalto Inc, 2016). See, e.g., *Gema/to Optelio contactless Sticker*, http://www.gemalto.com/brochures-site/download-site/Documents/fs_optelio_contactless sticker.pdf; and TBC Bank Payment Sticker, http://www.tbcbank.ge/web/en/pay-sticker, both of which are incorporated herein by reference. An exemplary contactless sticker construction may be found in U.S. Pat. No. 8,186,603, also incorporated herein by reference.

To date however, these solutions have only been employed as "add ons" for cell phones so that no app or mobile wallet is required.

In one aspect of the invention, the contactless payment module may be embedded inside the metal card body as an adhesive inlay. Ferrite inside the inlay provides RF shielding from the metal card body. A contact-only module, as is known in the art, is applied to the front of the card to enable contact only transactions. In another aspect of the invention, the contactless payment module may comprise a disc or plug disposed in a through-hole in the card. In certain embodiments, the contact-only module comprises a first IC chip and the contactless-only module comprises a second IC chip, and each chip is independently personalized. Thus, while each chip may be encoded with information corresponding to the same user, the digital codes transmitted by each chip are typically different, are read by different types of readers, and ultimately are decoded using information that resides in different memory locations. The terms "disc" and "plug" are used interchangeably herein, and use of one should be understood to also encompass the other. To the extent the term "disc" may be understood to imply a round or cylindrical shape, the term "plug" should be understood to refer to an insert having any geometry capable of being retained in the through-hole that is formed. It should also be understood that the through-hole may also have any geometry, although its geometry is typically suitably matched to the geometry of the plug or disc (e.g. similar but slightly smaller in some embodiments to facilitate a press fit, or similar but having internal threads configured to mate with external threads of the plug or disc in other embodiments). In other embodiments, the plug or disc may have a geometry that is substantially similar to the through hole, with the disc or plug having one or more features, such as tabs, prongs, protuberances, slots, or other minor differences designed to create an interference or to mate with a mating feature in the hole, to retain the disc or plug in the hole.

FIG. 1 depicts an exploded view of a contactless transaction module in the form of a RF shielded transaction adhesive inlay 1 (inlay 1, hereinafter) according to one embodiment of the invention. The terms sticker, inlay, adhesive inlay, disc, plug, contactless module and contactless transaction module may be used interchangeably herein.

The inlay 1 comprises an outer coated layer 2, an antenna layer 4, a ferrite layer 6, a filler layer 10, an adhesive layer 12 and a removable paper liner 14. The individual layers may be arranged in the order shown in FIG. 1, or, alternatively, the layers may be arranged in a different order. The total thickness of the inlay may be 0.01 inches (0.254 mm) to 0.033 inches (0.84 mm), for example. In this embodiment, filler layer 10 may be composed of any polymer amenable to the construction of the inlay, such as PVC, PET, PETG, polycarbonate, PET, PLA, co-polymers of the above or any other polymer known to the art. The filler layer 10 may dramatically change in thickness or composition depending on the structure of the contactless payment component.

The antenna layer 4 includes an integrated circuit that may contain software for open & closed loop payment systems, loyalty, identification and medical/social benefits. This IC is bonded to the antenna on the substrate. The antenna layer 4 is typically etched aluminum, but may use any antenna system known to the art, such as etched copper, copper wire, or "printed" antennas using conductive inks such as nanosilver. Printing methods may include nanojet/inkjet or screen printing. The pocket for the shielded RF adhesive inlay may be a blind pocket or a partial through hole, as shown in more detail in FIGS. 2 & 3.

The outer layer 2 may be formed from either paper or plastic and may be coated. A design may be printed on the outer layer 2. The design may be applied by printing, lasering, perforating, embossing, etc. to impart the desired design. Printing methods may include nanojet/inkjet or screen printing. Although referred to as a "paper/plastic layer" herein with reference to a common embodiment, it should be understood that the outer layer(s) of the contactless transaction module (in any and all embodiments described herein) are not limited to just paper and/or plastic, and may comprise any materials or combinations thereof known in the art capable of suitably transmitting the signals to and from the antenna 4. Thus, the aesthetics of the contactless transaction module may also include an outer decorative layer comprising wood, leather, ceramic, crystal, shielded or perforated metal, foil, or the like to impart a desired look to the card.

The contactless transaction module 1 may be mounted in a pocket of the card. The pocket may be a blind pocket or a through hole, as will be described hereinafter with reference to FIGS. 2A-3B.

Figure 2A:
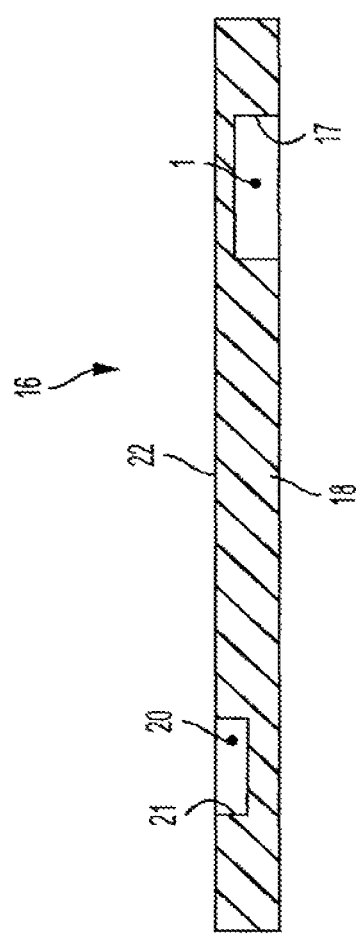
FIG. 2A is a schematic drawing depicting a cross sectional view of an exemplary card having a contact-only module and a contactless module, wherein the contactless module is disposed in a pocket formed in the card body.
Figure 2B:
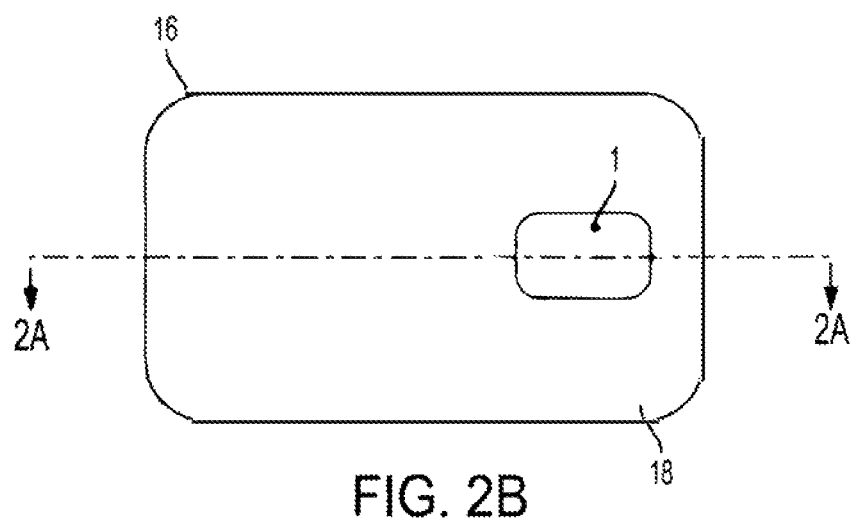
FIG. 2B is a schematic drawing depicting a plan view of the rear face of the exemplary card of FIG. 2A, showing the cross section line corresponding to FIG. 2A.

FIGS. 2A and 2B depict an exemplary card 16 having a contact-only module 20 and a contactless module (in the form of inlay 1). The contact-only module 20, as is known in the art, may sit in a blind pocket 21 that is "flush" to the front surface 22 of the card 16 to enable contact only transactions. The inlay 1 may sit in a blind pocket 17 that is "flush" to the rear surface 18 of the card 16, allowing for RF transmission and thus payment transactions from only one side of the card (the side to which the pocket 17 opens). The metal above the blind pocket 17 prevents RF transmission towards the front of the card, but RF transmission out through the top of the inlay 1 is possible as the ferrite 6 provides shielding from the metal layer. The antenna of the adhesive inlay 1 is tuned to optimal performance to accommodate the effects of the metal and ferrite. Although most convenient for assembly in a sticker format comprising all of the layers shown in FIG. 1 assembled in a inlay from which the liner 14 is removed from the adhesive 12 and the inlay 1 pressed into place in the pocket 17, it should be understood that the contactless module 1 for placement in the pocket 17 may have any number of constructions, including a construction in which it has no adhesive and adhesive is applied to the hole before inserting the module. In still other constructions, the antenna module inlay may be retained in the pocket other than adhesively. Furthermore, it should be understood that multiple inlays 1, each having an adhesive layer 12, may be stacked on top of one another in the pocket 17, with each inlay 1 containing one or more layers required to complete the assembly. Similarly, the layers may be disposed in situ in the pocket by any method known in the art to securely bind them in place, not limited to adhesive bonding.

Figure 3A:
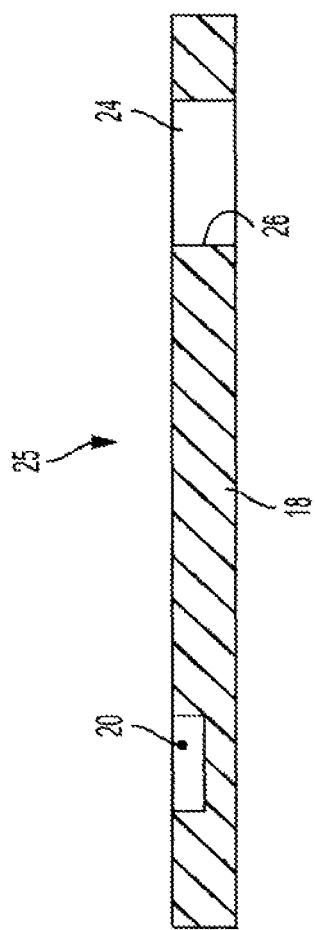
FIG. 3A is a schematic drawing depicting a cross sectional view of an exemplary card having a contact-only module and a contactless module, wherein the contactless module is disposed in a through-hole formed in the card body.
Figure 3B:
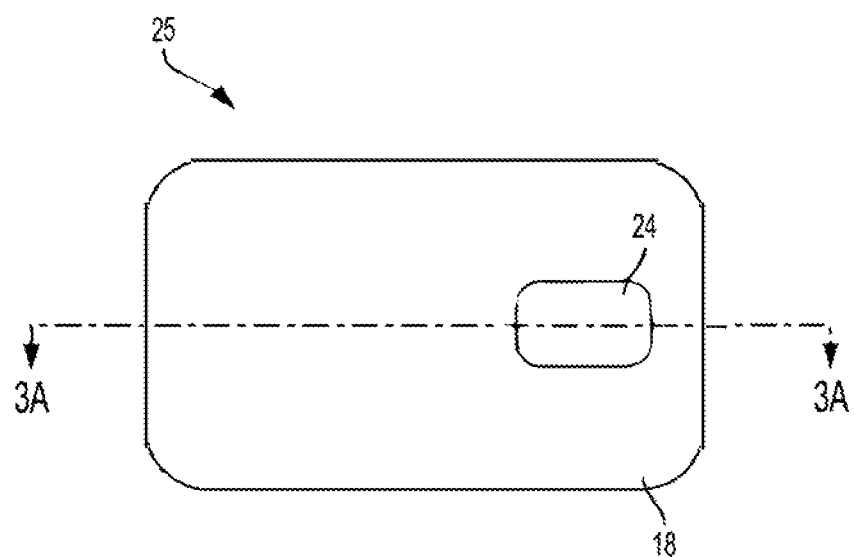
FIG. 3B is a schematic drawing depicting a plan view of the rear face of the exemplary card of FIG. 3A, showing the cross section line corresponding to FIG. 3A.

FIGS. 3A and 3B depict an exemplary card 25 having a contact-only module 20 and a contactless module 24. FIGS. 3A and 3B show a construction using a "through hole" design. In this design, the contactless module 24 in the form of a payment "plug" or disc 24 is press-fit or threaded within a through-hole 26 in the card 25 extending from the front to the back of the card 25. The disc 24 is held in place (i.e., fixed) in the hole 26.

In some embodiments, the plug or disc 24 may be relatively rigid and permanently held in place within the card body. Due to the complete removal of metal from the hole 26, RF transmission from both sides of the card 25 is possible and ferrite is typically not required in the plug or disc 24, giving the card 25 a higher performance level.

Figure 4A:
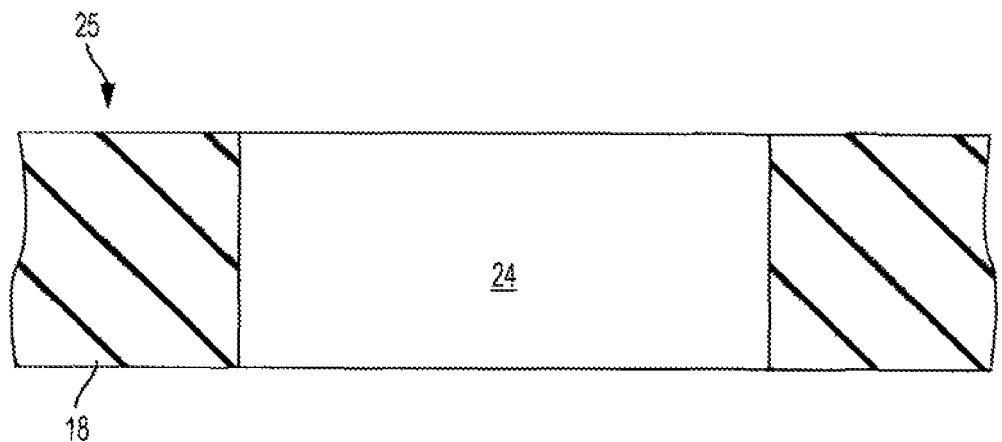
FIG. 4A is a schematic drawing depicting a detailed view of FIG. 3A, wherein the contactless module is shown in the form of a multi-layer plug or disc.

As shown in FIG. 4A, the plug or disc 24, like the inlay 1 of FIG. 1, may comprise a multi-layer design that includes the antenna and embedded IC layer, one or more filler layers above and/or below the antenna layer, and one or more outer coated paper/plastic layers, each of which is disposed to rest flush with the respective card surface and may have a design. Alternative variants 24a and 24b of the disc 24 are described hereinafter with reference to FIGS. 4B and 4C, respectively.

Figure 4B:
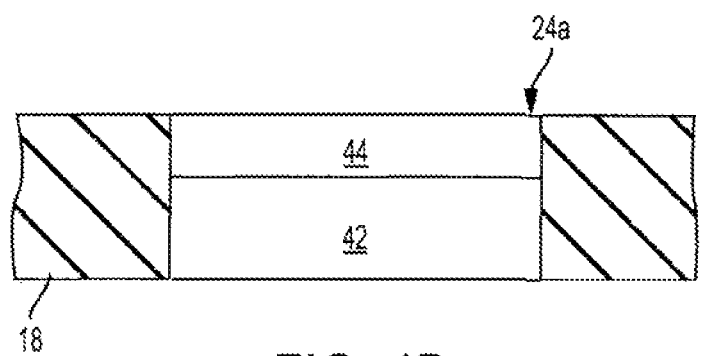
FIG. 4B is a schematic drawing, like FIG. 4A, depicting a contactless module in the form of a discrete contactless transaction module disposed on a plug or disc.
Figure 4C:
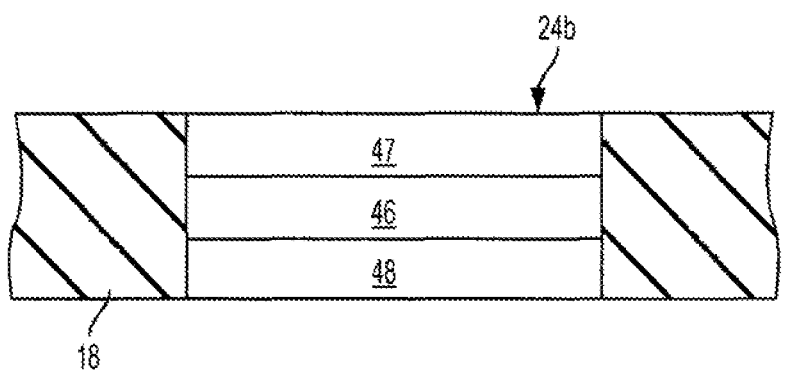
FIG. 4C is a schematic drawing, like FIG. 4A, depicting a contactless module in the form of a discrete contactless transaction module sandwiched between multiple plugs or discs.

In other embodiments of the disc 24a and 24b, illustrated in FIGS. 4B and 4C, respectively, at least the antenna and embedded IC layer comprising the contactless module may be part of inlay 44 or 46 (having at least adhesive and liner layers on one side) that is adhesively bonded to a separate plug or disc 42, 47 or 48, which may have an outer coated paper/plastic layer disposed to align with the external surface of the card and optionally, a filler layer. Such an inlay may have an outer surface designed to lay flush with the outer surface of the card, such as inlay 44 shown in FIG. 4B, or, as shown in FIG. 4C, plugs 47 and 48 may be disposed on both sides of inlay 46. The adhesive layers may be disposed on the inlay, on the plug, or on both. The multi-layer design of each disc 24/24a/24b may comprise layers that are bonded to another by any means known in the art, including adhesively.

Thus, methods for manufacturing the card may comprise any process for forming a card with a contact chip known in the art, in which the additional steps required to add contactless capability may be interposed at any point in the processing. The steps for adding contactless capability comprise first creating a void in the card body, such as by milling, etching, drilling, etc. The void may be in the form of a pocket 17, as shown in FIG. 2A, or a through hole 26 as shown in FIG. 3A. Then, the contactless module is placed in the void. In the process shown in FIG. 2A, placement of the contactless module 1 comprises adhesively bonding a contactless transaction inlay 1 in the pocket 17. In one embodiment, the contactless transaction module comprises a multi-layer adhesive inlay 1 as shown in FIG. 1.

In the process shown in FIG. 3A, placement of the contactless module 24 comprises placing a contactless transaction plug or disc 24 in the through-hole 26. This process may comprise press fitting, threading, or disposing by any other means known in the art, a module as shown in FIGS. 3C and 4A-4C into the through-hole. The contactless module may be a multi-layer module comprising at least the antenna/IC module and the outer-coated paper/plastic layers, and, typically one or more filler layers of FIG. 1. Such embodiments may have no ferrite layer and typically have no adhesive or liner layers.

Figure 3C:
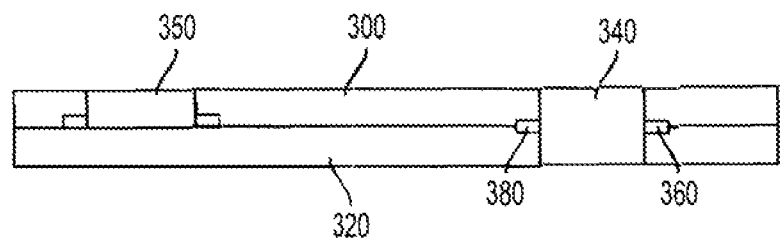
FIG. 3C is a schematic drawing depicting an alternate embodiment of an exemplary card having a contactless module is disposed in a through-hole formed in the card body and held in place using a two-piece card construction.

As shown in FIG. 3C, in one embodiment, the metal card may comprise two pieces 300, 320 and the module 340 may have at least two opposing radial tabs 360 and 380 adjacent to the through-hole, which tabs are disposed in with slots in the card body pieces such that the tabs hold the insert in place. Although shown with slots in both body pieces 300 and 320, it should be understood that the slots may be present in only one of the two pieces. In other embodiments, the tabs may be thin enough that no corresponding slots are needed. Although depicted as two discrete tabs, it should be understood that any number of tabs may be provided, including only a single tab in the form of a continuous radial protrusion that surrounds the entire periphery of the disc/plug may be provided. In the embodiment depicted in FIG.

3C, the contact-only module 350 may be inserted in a through hole in metal body piece 300, and may have a similar tab or set of tabs and optional corresponding slots to hold it in place. In other embodiments, the disc/plug, or one or more portions thereof, may be press-fit or adhesively bonded in the through-hole in the card as is shown in FIGS. 4A-4C. Module 40 may be inserted in a single step or the multiple layers of the module may be assembled in place in the corresponding through-hole, as is explained further herein.

In other disc/plug embodiments, it may be desirable to include a ferrite component. In particular, the disc/plug may include a ferrite component comprising a "ring" of ferrite in one or more of the layers to shield from the metal edges but still allow RF transmission in both directions perpendicular to the plane of the card. The ferrite ring may be disposed about the entire thickness of the disc/plug, just in one layer, or in multiple layers. For example, as shown in FIG. 5C, a disc/plug comprising outer design layers 60, filler layers 62, and antenna layer 64 as described herein, may have a ferrite "ring" 70 enveloping the entire periphery (but not the upper and lower surfaces of the disc/plug). Although referred to as a "ring," it should be understood that the ferrite may have any annular geometry, including circular, square, etc., and may or may not necessarily have the same shape as the disc/plug as a whole. The ferrite may be, without limitation, in the form of a coating or a sleeve into which the other layers are stacked. In another embodiment, as shown in FIG. 5 D, a disc/plug 32 may comprise outer layers 80, filler layers 82, and antenna layer 84, in which the ferrite 90 is disposed only in one layer. Although shown disposed in the antenna layer 84, it should be understood that the ferrite 90 may be isolated in its own layer or layers, and may be present in any one, all, or multiple but fewer than all of the layers in the stack (and, additionally, the stack is not limited to only the layers or all of the layers shown). Thus, the ferrite component 90 may extend in the relevant dimension from the front surface of the card to the back surface of the card, or may extend dimensionally less than surface to surface.

Figure 5A:
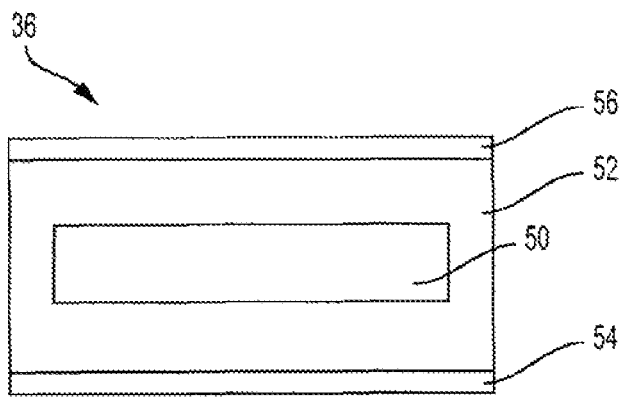
FIG. 5A is a schematic drawing depicting a cross-section of a multi-layer plug or disc embodiment in which the antenna layer is fully surrounded by filler.
Figure 5B:
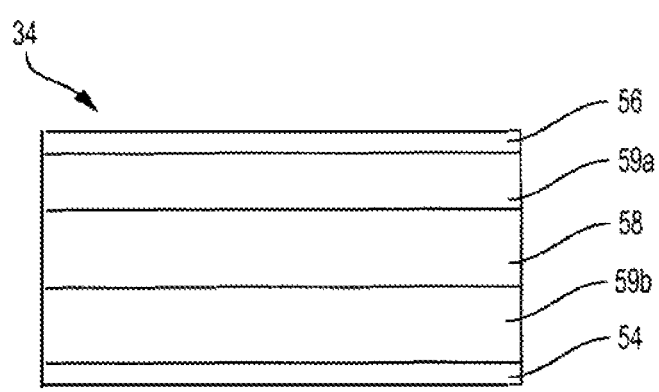
FIG. 5B is a schematic drawing depicting a cross-section of a multi-layer plug or disc embodiment in which the antenna layer is sandwiched between filler layers.
Figure 5C:
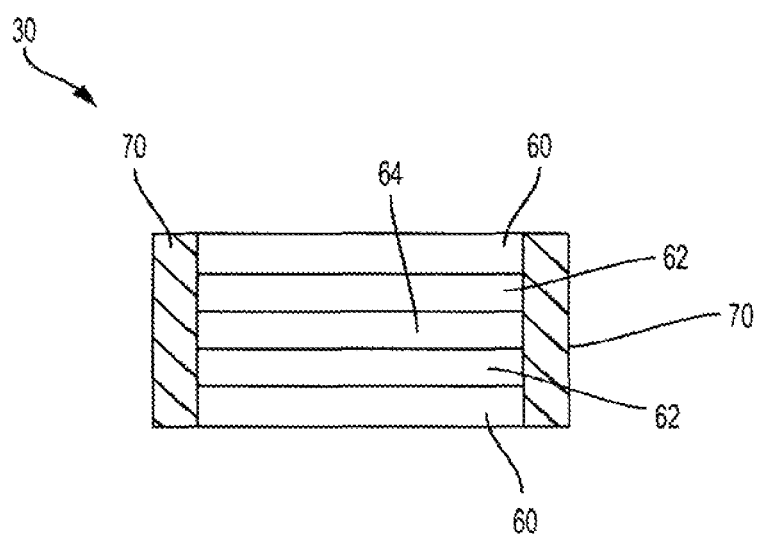
FIG. 5C is a schematic drawing depicting a cross-section of a multi-layer plug or disc embodiment comprising a ferrite ring.
Figure 5D:
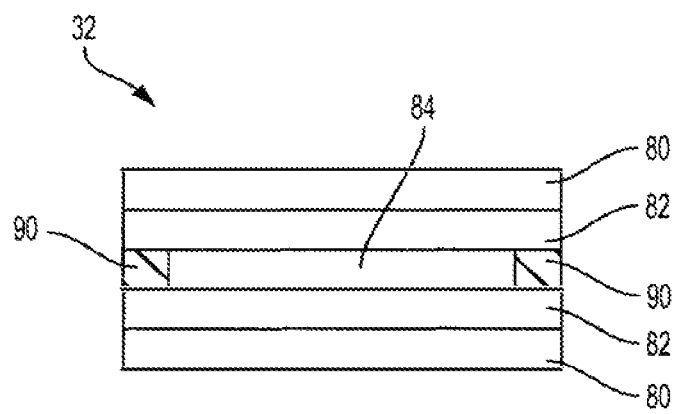
FIG. 5D is a schematic drawing depicting a cross-section of a multi-layer plug or disc embodiment comprising a ferrite ring in one layer.

Furthermore, although depicted in both FIGS. 5C and 5D, it should be understood that the ferrite component may not necessarily be the outermost material, and that other components (e.g. filler) may comprise the outer periphery and/or lie between the ferrite and the disc/plug outer periphery that lies in contact with or otherwise closest to the card body. However, the annular ferrite component is generally disposed at the outer periphery of the plug or disc or near the outer periphery (i.e. relatively closer to the outer periphery than to a central axis of the disc or plug) to provide appropriate shielding for the components disposed in the annulus formed by the ferrite component. Although the ferrite ring 70/90 is illustrated herein with respect to a disc/plug embodiment configured for placement in a through-hole in the card body, it should be understood that this feature may also be applied to embodiments intended for placement in a blind pocket in the card body.

In other embodiments, the process of placing the contactless transaction plug or disc in the pocket may comprise disposing at least a first plug or disc in the through-hole, and placing a contactless transaction module on top of the plug or disc, such as in the form of an adhesive inlay, as shown in FIG. 4B. In such an embodiment, the contactless transaction inlay comprises at least the antenna/IC module, a first outer-coated paper/plastic layer for resting flush with one surface of the card, and the adhesive and liner layers (with the liner layer being removed before adhering the sticker to the plug, and the plug may comprise the filler layer and a second outer-coated paper plastic layer for resting flush with the other surface of the card. In yet another embodiment, the process of placing the contactless transaction plug or disc in the pocket may comprise disposing the first plug or disc in the through-hole, placing a contactless transaction module on top of the first plug or disc, and placing a second plug or disc atop the contactless transaction module, as shown in FIG. 4C. In such an embodiment, the contactless transaction sticker comprises at least the antenna/IC module and one or more adhesive layers (with removable liner paper disposed over the adhesive layer until the step of adhering the sticker to the plug), and each plug comprises at least an outer-coated paper/plastic layer for resting flush with an outer surface of the card, and typically also a filler layer, and may also include one or more adhesive layers. In this embodiment, the adhesive layers may be provided as part of the plug or the contactless module, or both.

It should be understood that in a multilayer disc or plug as described above with respect to FIG. 4A, assembly of the multilayer disc or plug may comprise providing one or more of the layers as described herein in the form of a adhesive inlay, and adhering that adhesive inlay to one or more of the other layers to assemble the multi-layer component. The assembly process may comprise, for example, the assembly of a sheet containing multiple antenna/IC modules and paper/plastic outer layers comprising multiple, discrete printed units aligned with each antenna/IC module, and stamping or cutting out each multilayer disc or plug from the assembled multi-layer sheet to create the discs or plugs are then disposed in the through-hole. Thus, in one multi-layer embodiment of the plug or disc 34 shown in FIG. 5B, the antenna/IC module 58 may be sandwiched between discrete filler layers 59a and 59b, such as may be assembled by the method described above (with adhesive layers not shown in FIG. 5B). The module 58 and the filler layers 59a and 59b are sandwiched between two outer layers 54 and 56.

In another embodiment of the plug or disc 36 shown in FIG. 5A, antenna/IC module 50 layer may be embedded in a filler layer 52 that surrounds the antenna/IC module 50 layer on all sides. The filler layer 52 is sandwiched between outer layers 54 and 56. Filler layer 52 may actually comprise two layers (not shown), each with a pocket formed to accommodate the antenna 50, or one layer with a pocket and one layer covering the pocket opening, or the two filler layers may have no pockets and may be laminated together to create a sealed portion around the edges of the antenna/IC module 50.

In yet another embodiment, depicted in FIGS. 6A-7B, card body 600 may have a configuration for accommodating a dual interface module. Body 600 may have a through hole 602 formed within a pocket 604. Pocket 604 may be milled out to accommodate an inlay, such as adhesive inlay 700 of FIGS. 7A and 7B.

Adhesive inlay 700 comprises a first portion 704 having the ferrite and antenna structure as described herein, and a second portion 702 configured to inductively couple to the module and having no ferrite. The ferrite may be removed or omitted during fabrication of the inlay 700, or the ferrite may be milled away during the process of embedding the module.

Figure 6B:
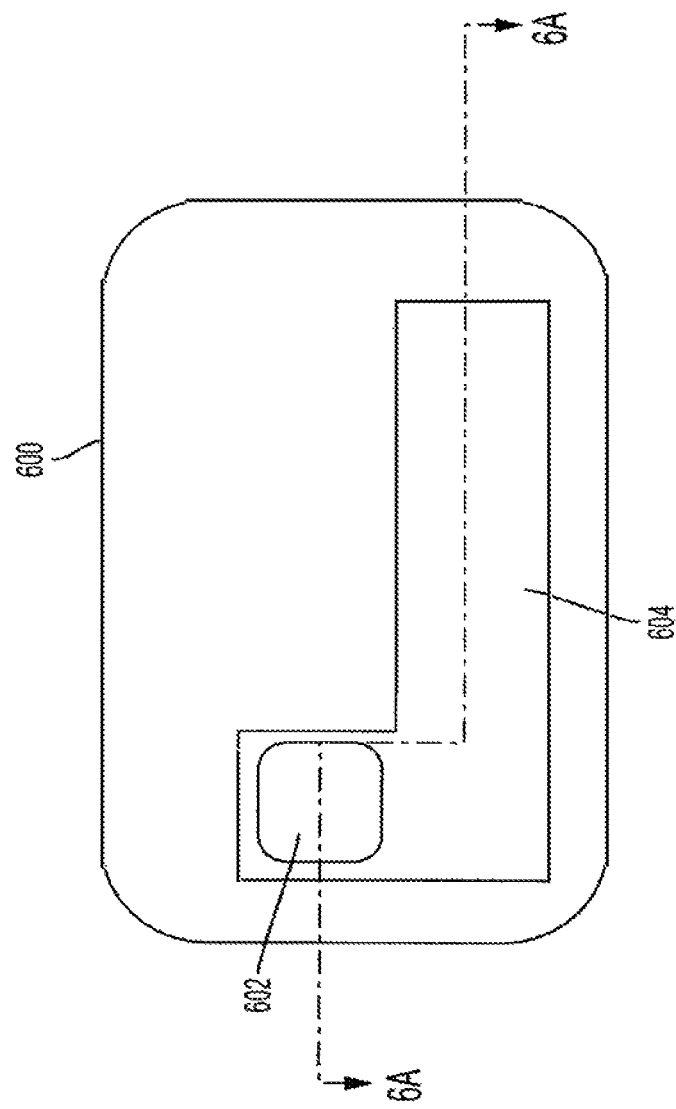
FIG. 6B is a schematic drawing depicting a plan view of the rear face of the exemplary card of FIG. 6A, showing the cross section line corresponding to FIG. 6A.
Figure 7A:
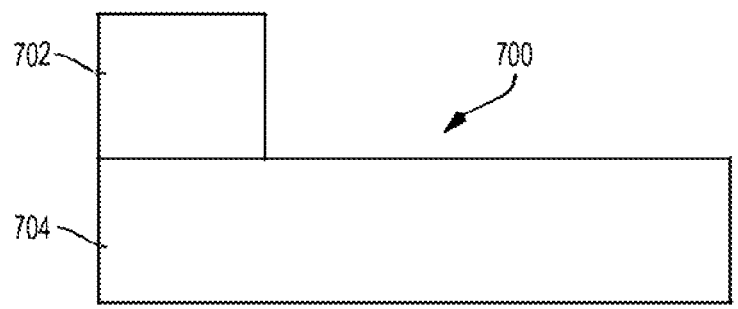
FIG. 7A is a plan view of an exemplary dual interface module for insertion in the exemplary card of body of FIG. 6A.
Figure 7B:
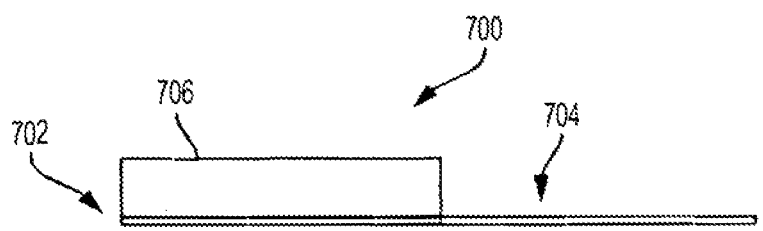
FIG. 7B is a side view of the exemplary dual interface module of FIG. 7A, with a plug mounted thereto.

As shown in the profile view of FIG. 7B, the inlay 700 may further have a plug 706 bonded to the module coupling area for the contact module to be embedded into. Plug 706 may be any non-metallic material, such as plastic. An advantage of the configuration shown in FIGS. 6A and 7B, is that it permits use of a single dual interface module rather than two separate IC (one for contact and one for contactless). In the other embodiments described herein, the contact-only and the contactless-only chips are not physically connected to one another or in communication with one another, meaning that they typically need to be separately personalized. Having a single module increases personalization speed when the card is assigned to a user. Although described with the contact module (including the integrated circuit (IC) shared by both the contact and contactless interfaces) embedded in the plug, it should be understood that the common IC may be embedded in the plug or in the sticker. What is important is that the contacts exposed on the surface of the card (and embedded in the plug) that physically connect to a card reader are connected to the same IC as the antenna structure (embedded in the sticker) used for a contactless interface with a card reader.

In one, exemplary implementation, inlay 700 is fabricated with plug 706 bonded to the contactless module inlay 700. Separately, card body 600 is formed, hole 602 is laser cut, and pocket 604 is milled. The inlay/plug combination is then inserted in the pocket/hole in the card body, and a module is embedded in or otherwise bonded to the plug, or the module may be embedded into the plug before insertion into the pocket/hole in the card body. The embedding process may comprise removing ferrite from the sticker underlying the plug, or the sticker may be fabricated with the ferrite removed prior to insertion of the sticker into the pocket, or prior to attachment of the plug to the sticker.

Figure 7C:
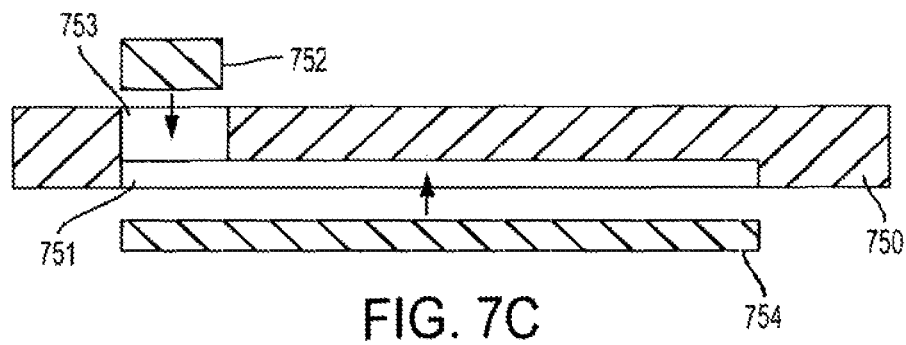
FIG. 7C is a schematic drawing depicting a cross-section of an exemplary card having a contactless module and contact-only module.

In still another embodiment, depicted in FIG. 7C, plug 756 (and the associated contact module embedded therein) may be installed separately in the card body from the contactless module inlay 754. The contactless module inlay may have an etched, printed or wire RF antenna. In one method, pocket 751 may be formed first in body 750, then the contactless module inlay 754 is inserted in the pocket, and then hole 753 is milled down to the contacts (not shown) of the contactless module inlay, and the plug (and contact module) is connected to those contacts, such as via wire bonding or flip chip bonding. In still another embodiment, the hole 753 and pocket 751 are cut and the plug 756 (and contact module embedded therein) are inserted in the hole, with a connection (e.g. contact pads, not shown) to the contact module exposed, and then the contactless module inlay 754 is applied to the pocket with contacts (not shown) of the contactless module inlay mating to the connection to the contact module. In all of the foregoing, it should also be understood that the term "plug" refers to any isolation disposed around the contacts and any IC connected thereto in hole 753. Although plug 756 is shown and described as a freestanding member in FIGS. 7B and 7C, it is not limited to any particular construction, especially in embodiments in which the contact and surrounding isolation are disposed in the card separately from the contactless module inlay.

In another exemplary construction, referring to FIG. 7C, rather than connecting directly via contacts to the payment module, the contactless module inlay 754 antenna may inductively couple with a standard inductive coupling dual interface (DI) module embedded in plug 756, such as a standard DI module known in the art.

Figure 8:
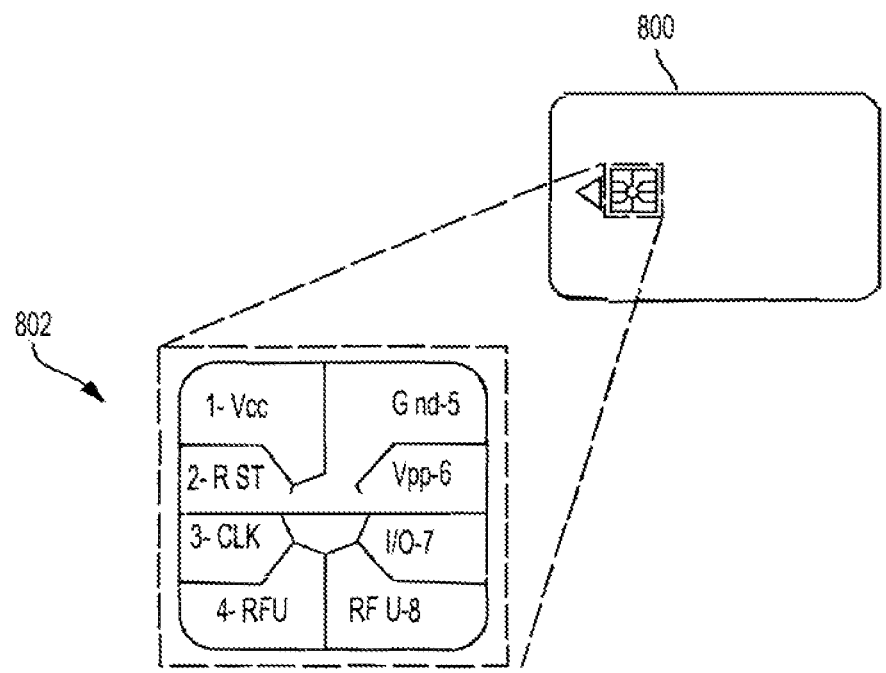
FIG. 8 is a schematic drawing depicting the pins of an exemplary contact-only module or contact faceplate.
Figure 9:
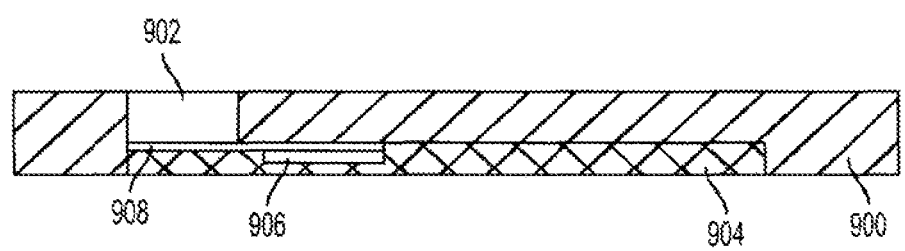
FIG. 9 is a schematic drawing depicting an embodiment in which the payment module is embedded in the contactless module inlay and connects to a contact faceplate via traces.

In yet another embodiment, the payment IC is mounted to the contactless inlay, such as by wire bonding or flip chip bonding. The inlay may have an etched, printed, or wire RF antenna. The inlay provides functionality for the card to conduct contactless transactions. FIG. 9 depicts a card body 900 having a payment IC 906 mounted on contactless inlay 904. FIG. 8 depicts the standard layout 802 of the contact pins of a contact module in an exemplary card 800. Traces 908 for pins 1-6 are run from the payment IC to the contact module area, and, for example, laminated into the body of the card or the inlay. A hole is milled to accommodate the contact pins 802 on the front face of the card. A "false" module faceplate 902 with no IC connected is bonded to the traces 908 on the inlay so the IC 906 on the inlay can conduct both contact and non-contact transactions. Each trace is bonded to the appropriate pin 1-6 on the IC 906. In order for the faceplate 902 to reach the traces of the inlay physically and make an electrical connection, copper (or any electrically conductive) pads may be installed on the inlay 904 or the faceplate 902. The electrical connection between the faceplate and the inlay may be accomplished by, for example, ACF tape, soldering, or conductive epoxy. Providing a direct connection between the payment module 906 and the contactless antenna may help avoid problems arising from poor connectivity between the contactless antenna and the payment module when they are only inductively coupled to one another.

The card as described herein is thus a "full metal" card in the sense that it comprises a continuous metal edge and the metal card body has a unitary construction that is not disrupted with a booster antenna embedded in the metal body itself. The non-metal components in the pocket or through-hole do not have the same detrimental effect on the metallic sound of the card as do the antenna or edge gap.

In still another embodiment, rather than being inserted in a pocket or through-hole, the contactless module may be constructed as a full-face layer that is adhesively bonded to one side of the metal card. The contactless module so constructed may interface with the other component cards in any of the ways described herein (i.e. it may be separately personalized relative to the contact-only module, a single operative dual interface IC may reside on the full-face layer and connect via a contact pad to the contact-only faceplate, or a single operative dual interface IC may reside on the card and may connect to an antenna-only full face layer via contacts or via inductive coupling. The full-face contactless module layer may have one or more further layers bonded thereto, such as a layer comprising, for example, the magnetic strip, signature pad, bar code, cardholder photo, holograms, branding, printed security codes, and the like.

Although the invention is illustrated and described herein with reference to specific embodiments, the invention is not intended to be limited to the details shown. Rather, various modifications may be made in the details within the scope and range of equivalents of the claims and without departing from the invention. In particular, although the contactless modules are shown and described herein as having particular layers, it should be understood that certain embodiments may have more or fewer layers, and the layers may have a different order from top to bottom than those shown in the examples. Furthermore, to the extent an adhesive layer is shown and described with respect to certain embodiments, it should be understood that various other layers may be adhesively bonded to one another without expressly disclosing the nature of the bonds between layers. Although the contactless transaction module is shown and described in certain embodiments as having an adhesive bond between the contactless module and the bottom of the pocket, it should be understood that other types of bonds may be used between the contactless module and the bottom of the pocket. Furthermore, although the adhesive may be provided as part of a contactless module in the form of a sticker in some embodiments, in other embodiments, adhesive may be applied to the pocket before placing a non-adhesive contactless module in the pocket. In still other embodiments, adhesive may be provided both as part of a sticker module and in the pocket. Finally, although the constructions described and shown herein may be particularly well suited for use in cards having a metal card body, it should be understood that the card body may comprise any materials construction or combinations thereof, including but not limited to metal, plastic, wood, leather, ceramic, and laminates or hybrids comprising layers of more than one material of construction.

What is claimed:

1. A transaction card comprising:
a metal card body having first and second surfaces;
a first module secured in the card body and comprising a first circuit;
a second module secured in a void in the metal card body, the second module comprising a second circuit and an antenna, wherein (i) the first circuit and the second circuit are not physically electrically connected to one another and (ii) the first circuit and the second transaction circuit are not connected to any shared circuit component, and (iii) at least one of the first module and the second module comprises a transaction module;
wherein the void comprises a blind pocket open to the second surface of the card body; and
wherein the second module comprises an outer layer disposed flush with the second surface of the card body and the second module further comprises a layer containing the second circuit and the antenna, an RF shielding layer, and an adhesive layer; and
wherein the second module comprises a multi-layer plug or disc that has a first outer layer aligned with the first surface of the card body and a second outer layer aligned with the second surface of the card body.

2. The transaction card of claim 1, wherein the first module and the second module both comprise transaction modules.

3. The transaction card of claim 1, wherein the first module comprises a contact-only transaction module and the second module comprises a contactless transaction module.

4. The transaction card of claim 1, wherein the second transaction module is adhesively bonded to a bottom of the pocket.

5. The transaction card of claim 4, wherein the second transaction module is adhesively bonded to a bottom of the pocket by the adhesive layer of the second transaction module.

6. The transaction card of claim 1, wherein the first circuit and the second circuit are independently personalized.

7. The transaction card of claim 1, wherein the layer containing the second circuit and the antenna is located between the first and second outer layers.

8. The transaction card of claim 7, wherein the second module comprises an annular RF shielding component disposed at or near an outer periphery of the plug or disc for at least a portion of a dimension from the first surface of the card to the second surface of the card.

9. A process for manufacturing a transaction card, the process comprising the steps of:
(a) constructing a metal card body having first and second surfaces;
(b) securing a first module in the card body, the first module comprising a first circuit;
(c) forming a void comprising a blind pocket open to the second surface of the card body;
(d) securing a second module in the void, the second module comprising a second circuit and an antenna, wherein (i) the first circuit and the second circuit are not physically electrically connected to one another and (ii) the first circuit and the second transaction circuit are not connected to any shared circuit component, and (iii) at least one of the first module and the second module comprises a transaction module; and
wherein the second module comprises an outer layer disposed flush with the second surface of the card body and the second module further comprises a layer containing the second circuit and the antenna, an RF shielding layer, and an adhesive layer; and
wherein step (d) further comprises providing the second module as a multi-layer plug or disc that has a first outer layer aligned with the first surface of the card body and a second outer layer aligned with the second surface of the card body.

10. The process of claim 9, wherein the step of securing the second module in the void comprises adhesively bonding the contactless transaction portion to a bottom of the pocket with the outer layer of the contactless transaction portion disposed flush with the second surface of the card body.

11. The process of claim 10, wherein the step of securing the first module in the card body is performed after bonding the contactless transaction portion to the bottom of the pocket.

12. The process of claim 9, further comprising (e) personalizing the first circuit independently from personalizing the second circuit.

13. The process of claim 9, wherein step (a) comprises constructing the metal card body as a two-piece construction, including a first piece embodying the first surface and a second piece embodying the second surface.

14. The process of claim 13, further comprising providing each of the first module and the second module with at least one tab positioned to be received at an interface between the first piece of the card body and the second piece of the card body.

15. The process of claim 14, further comprising providing one or more slots in the first piece of the card body, the second piece of the card body, or both, positioned to receive the at least one tab on one or both of the first module and the second module.

16. The process of claim 9, wherein step (d) of providing the second module as the multi-layer plug or disc comprises embedding or bonding the second module having the second circuit and the antenna into the multi-layer plug or disc.

17. The process of claim 16, wherein the second module having the second circuit and the antenna is embedded or bonded into the multi-layer plug or disc prior to securing the second module in the void.

18. The process of claim 9, further comprising assembling the multi-layer plug or disc, and assembling the multi-layer plug or disc comprises providing at least one adhesive inlay, and adhering the at least one adhesive inlay to one or more of the other layers to assemble the multi-layer plug or disc.

19. The process of claim 18, wherein the multi-layer plug or disc comprises a first filler layer and a second filler layer, the second module having the second circuit and the antenna being disposed between the first filler layer and the second filler layer.

* * * * *